United States Patent
Vadlamani et al.

(10) Patent No.: US 11,102,986 B2
(45) Date of Patent: Aug. 31, 2021

(54) GLUTEN-FREE COMPOSITIONS AND METHODS FOR PRODUCING SHELF-STABLE BREADS AND OTHER BAKERY PRODUCTS

(71) Applicant: Campbell Soup Company, Camden, NJ (US)

(72) Inventors: Keswara Rao Vadlamani, Marlton, NJ (US); Maia Ketola Lapic, Collingswood, NJ (US); Susan Michelle Higgins, Florence, NJ (US)

(73) Assignee: Campbell Soup Company, Camden, NJ (US)

( * ) Notice: Subject to any disclaimer, the term of this patent is extended or adjusted under 35 U.S.C. 154(b) by 418 days.

(21) Appl. No.: 15/791,619

(22) Filed: Oct. 24, 2017

(65) Prior Publication Data

US 2018/0116230 A1   May 3, 2018

Related U.S. Application Data

(60) Provisional application No. 62/414,053, filed on Oct. 28, 2016.

(51) Int. Cl.
*A21D 13/066* (2017.01)
*A21D 2/18* (2006.01)
(Continued)

(52) U.S. Cl.
CPC ........... *A21D 13/066* (2013.01); *A21D 2/186* (2013.01); *A21D 2/188* (2013.01); *A21D 2/36* (2013.01);
(Continued)

(58) Field of Classification Search
None
See application file for complete search history.

(56) References Cited

U.S. PATENT DOCUMENTS

| | | | |
|---|---|---|---|
| 4,608,265 A | 8/1986 | Zwiercan et al. | |
| 6,168,857 B1 * | 1/2001 | Andersen | B28B 1/00 428/220 |

(Continued)

FOREIGN PATENT DOCUMENTS

| | | |
|---|---|---|
| EP | 872188 | 10/1998 |
| WO | 2006107809 | 10/2006 |

(Continued)

OTHER PUBLICATIONS

Meireles et al., Physicochemical properties, modifications and applications of starches from different botanical sources, Food Sci. Techno, Campinas, 35(2): 215-236, Abr.-Jun. 2015 (Meireles).*

(Continued)

*Primary Examiner* — Donald R Spamer
*Assistant Examiner* — Philip A Dubois
(74) *Attorney, Agent, or Firm* — Pauly, DeVries Smith & Deffner LLC

(57) ABSTRACT

Embodiments herein include gluten-free baked products such as breads gluten-free flour formulations, and related methods. In an embodiment, a bread flour substitute composition is included having a starch blend and a hydrocolloid blend. The starch blend can include a native starch with 20-30% amylose content, a native waxy starch with 0-1% amylose content, and a cross-linked starch. The hydrocolloid blend can include hydroxypropyl methylcellulose (HPMC) and psyllium fiber. The composition can include between 0 and 20 ppm gluten. Other embodiments are also included herein.

16 Claims, 5 Drawing Sheets

(51) Int. Cl.
| | |
|---|---|
| *A21D 10/00* | (2006.01) |
| *A21D 2/36* | (2006.01) |
| *A21D 13/40* | (2017.01) |
| *A21D 13/043* | (2017.01) |
| *A21D 13/047* | (2017.01) |
| *A21D 8/02* | (2006.01) |
| *A21D 8/06* | (2006.01) |

(52) U.S. Cl.
CPC ............... *A21D 8/02* (2013.01); *A21D 8/06* (2013.01); *A21D 10/005* (2013.01); *A21D 13/043* (2017.01); *A21D 13/047* (2017.01); *A21D 13/40* (2017.01)

(56) References Cited

U.S. PATENT DOCUMENTS

| | | | |
|---|---|---|---|
| 2005/0008761 A1 | 1/2005 | Paulus et al. | |
| 2005/0053715 A1 | 3/2005 | Dolores-Martinez-Serna Villagran et al. | |
| 2006/0088647 A1 | 4/2006 | Kadan et al. | |
| 2007/0031564 A1 | 2/2007 | Fontanesi et al. | |
| 2008/0044518 A1* | 2/2008 | Johnson | A21D 2/36 426/18 |
| 2009/0017170 A1* | 1/2009 | Armstrong | A21D 13/22 426/104 |
| 2009/0123627 A1 | 5/2009 | Shepard et al. | |
| 2010/0015279 A1 | 1/2010 | Zhang et al. | |
| 2010/0021610 A1 | 1/2010 | Fukasawa et al. | |
| 2010/0310747 A1* | 12/2010 | Paulus | A21D 13/04 426/549 |
| 2011/0045146 A1 | 2/2011 | Canty et al. | |
| 2011/0281010 A1 | 11/2011 | Parry et al. | |
| 2014/0342045 A1 | 11/2014 | Mesdag | |
| 2014/0370178 A1 | 12/2014 | Boursier et al. | |
| 2015/0004300 A1 | 1/2015 | Cavalieri Manasse | |
| 2015/0140173 A1 | 5/2015 | Mesdag | |
| 2015/0342201 A1 | 12/2015 | Thomas et al. | |
| 2016/0073665 A1 | 3/2016 | Mohindru | |
| 2016/0120191 A1 | 5/2016 | Dacey et al. | |
| 2016/0150798 A1 | 6/2016 | Dacey et al. | |
| 2017/0079287 A1 | 3/2017 | Rake-Kukic et al. | |
| 2018/0116231 A1 | 5/2018 | Vadlamani et al. | |

FOREIGN PATENT DOCUMENTS

| | | |
|---|---|---|
| WO | 2007060549 | 11/2007 |
| WO | 2007062012 | 11/2007 |
| WO | 2007093996 | 4/2009 |
| WO | 2012127215 | 2/2013 |
| WO | 2016210408 | 12/2016 |
| WO | 2017131973 | 8/2017 |
| WO | 2018081369 | 5/2018 |
| WO | 2018081376 | 5/2018 |

OTHER PUBLICATIONS

M. Z.M. Nor, R.A. Talib, M. A. Noranizan, N. L. Chin & K. Hashim (2014) Increasing Resistant Starch Content in Fish Crackers Through Repetitive Cooking-Chilling Cycles, International Journal of Food Properties, 17:5, 966-977.*

Nachay, Formulating the Perfect Piece of Cake, Feb. 1, 2105, accessed at https://www.ift.org/news-and-publications/food-technology-magazine/issues/2015/february/columns/ingredients.*
Anon, Amylose and Amylopectin, International Starch Insititue, accessed at http://www.starch.dk/isi/starch/starch.asp, 1999.*
Ceballos, et al., Comparison of Pasting and Gel Stabilities of Waxy and Normal Starches from Potato, Maize, and Rice with Those of a Novel Waxy Cassava Starch under Thermal, Chemical, and Mechanical Stress, J. Agric. Food Chem. 2010, 58, 5093-5099.*
"International Search Report and Written Opinion," for PCT Application No. PCT/US2017/058463 dated Feb. 9, 2018 (12 pages).
"Baking Science into Success," retrieved Mar. 13, 2017 from URL <http://web.archive.org/web/20151216015510/http://msdssearch.dow.com/PublishedLiteratureDOWCOM/dh_0943/0901b80380943ab2.pdf?filepath=dowwolff/pdfs/noreg/194-01539.pdf&fromPage=GetDoc>, (12 pages).
Capriles, Vanessa D. et al., "Novel Approaches in Gluten-Free Breadmaking: Interface between Food Sicence, Nutrition, and Health," Comprehensive Reviews in Food Science and Food Safety, Aug. 2014, vol. 13, No. 5 (20 pages).
"Gluten Free White Bread Mix," SalDoce Fine Foods, Dec. 2015, New Zealand, Australia (3 pages).
Horstmann, Stefan et al., "Fundamental Study on the Impact of Gluten-Free Starches on teh Quality of Gluten-Free Model Breads," Foods, Apr. 2016 vol. 5, No. 2 (12 pages).
Howler, R.H. et al., "Cassava, Starch and Starch Derivatives," Proceedings of the International Symposium held in Nanning, Guanxi, China. Nov. 11-15, 1996 (3 pages).
"International Search Report and Written Opinion," for PCT Application No. PCT/US2017/058454 dated Jan. 2, 2018 (16 pages).
Kieffer, R. et al., "Correlations of the Breadmaking Performance of Wheat Flour with Rheological Measurements on a Micro-Scale," Journal of Cereal Science 27 (1998) 53-60 (8 pages).
"White Bread Mix," Coles Simply Gluten Free, Feb. 2015, Australia (3 pages).
Zandonadi, Renata P. et al., "Psyllium as a Substitute for Gluten in Bread," Journal of the American Diatetic Association, Oct. 2009, vol. 109, No. 10 (4 pages).
"International Preliminary Report on Patentability," for PCT Application No. PCT/US2017/058454 dated May 9, 2019 (11 pages).
"International Preliminary Report on Patentability," for PCT Application No. PCT/US2017/058463 dated May 9, 2019 (9 pages).
Arns, Bruna et al., "Impact of Heat-Moisture Treatment on Rice Starch, Applied Directly in Grain Paddy Rice or in Isolated Starch," Food Science and Technology 60 (2015) 708-713 (6 pages).
Fu, Zhen et al., "Developments in Hydroxypropylation of Starch: A Review," Starch-Stärke 2019, 71: 1800167 (10 pages).
"Final Office Action," for U.S. Appl. No. 15/791,631 dated Apr. 3, 2020 (17 pages).
"Non-Final Office Action," for U.S. Appl. No. 15/791,631 dated Nov. 14, 2019 (15 pages).
"Response to Non-Final Office Action," for U.S. Appl. No. 15/791,631 filed with the USPTO Feb. 14, 2020 (8 pages).
Mihalos, Mihaelos N. et al., "Cracker Tech 101," Bakingbusiness. com, Accessed at https://www.bakingbusiness.com/articles/35924-cracker-tech-101#:-:text=The%20lamination%20step%20provides%20strong,%20%2Darm%20and%20cut%2Dsheet, 2014 (7 Pages).
"Non-Final Office Action," For U.S. Appl. No. 15/791,631 dated Dec. 31, 2020 (20 Pages).
Thomson, J. et al., "A Comparison of The Starches From Barley and Malted Barley," J. Inst. Brew., vol. 65, 1959 (8 Pages).

* cited by examiner

* # GLUTEN-FREE COMPOSITIONS AND METHODS FOR PRODUCING SHELF-STABLE BREADS AND OTHER BAKERY PRODUCTS

This application claims the benefit of U.S. Provisional Application No. 62/414,053, filed Oct. 28, 2016, the content of which is herein incorporated by reference in its entirety.

FIELD

Embodiments herein relate to gluten-free flour compositions, baked product made using the same, and methods for making shelf-stable breads and other bakery products.

BACKGROUND

The gluten-free market is a global trend and currently estimated to be $3.2 billion worldwide. The term "gluten-free" has been defined by the U.S. Food and Drug Administration (FDA) as meaning that the food either is inherently gluten-free; or does not contain an ingredient that is: 1) a gluten-containing grain (e.g., spelt wheat); 2) derived from a gluten-containing grain that has not been processed to remove gluten (e.g., wheat flour); or 3) derived from a gluten-containing grain that has been processed to remove gluten (e.g., wheat starch), if the use of that ingredient results in the presence of 20 parts per million (ppm) or more gluten in the food. As such, in the context of a baked product such as bread, a food product can be considered "gluten-free", as long as the gluten content in the product is below 20 ppm.

Less than 1% of the US population has been diagnosed with celiac disease and another 6% are non-celiac gluten-sensitive, for which the only treatment is a gluten-free diet. However, beyond the more limited number of people with specific medical concerns, consumers are seeking gluten-free foods because they are being perceived as being healthier, which increases the buying public to about 25%.

Gluten is a functional protein found in wheat, rye, barley, spelt, kamut, and triticale (a crossbreed of wheat and rye) grains. Gluten is essential for dough functionality in baked products, as it contributes to extensibility, mix tolerance, gas-holding capacity, and structure.

Gluten-free baked products are difficult to formulate and achieve properties similar to their wheat-based counterparts. Several technical challenges include poor machinability, dense loaf volume, gritty/brittle texture, shorter shelf life, and undesirable flavor.

Most existing commercial gluten-free bread products tend to stale faster, limiting their shelf-life substantially. As such, most existing commercial gluten-free bread products are currently sold in the frozen aisle.

Bread staling is a complex phenomenon, the mechanism of which is not clearly understood. Traditional breads use enzymes, and emulsifiers to control staling. However these approaches do not work in gluten-free formulations.

SUMMARY

Embodiments herein include gluten-free baked products such as breads and gluten-free flour formulations, and related methods. In an embodiment, a bread flour substitute composition is included having a starch blend and a hydrocolloid blend. The starch blend can include a native starch with 20-30% amylose content, a native waxy starch with 0-1% amylose content, and a cross-linked starch. The hydrocolloid blend can include hydroxypropyl methylcellulose (HPMC) and psyllium fiber. The composition can include between 0 and 20 ppm gluten.

In an embodiment, a shelf-stable baked product is included having at least about 2.5 cc/g loaf specific volume and a flour substitute composition. The flour substitute composition can include a starch blend and a hydrocolloid blend. The starch blend can include a native starch with 20-30% amylose content, a native waxy starch with 0-1% amylose content, and a cross-linked starch. The hydrocolloid blend can include hydroxypropyl methylcellulose (HPMC) and psyllium fiber. The composition can include between 0 and 20 ppm gluten.

In an embodiment, a method of making a shelf-stable baked product is included. The method can include mixing a flour substitute composition with water to form a dough. The method can also include scaling the dough, forming the dough into a desired shape, proofing the dough, and baking the dough to form a finished product. The flour substitute composition can include a starch blend and a hydrocolloid blend. The starch blend can include a native starch with 20-30% amylose content, a native waxy starch with 0-1% amylose content, and a cross-linked starch. The hydrocolloid blend can include hydroxypropyl methylcellulose (HPMC) and psyllium fiber. The composition can include between 0 and 20 ppm gluten.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope herein is defined by the appended claims and their legal equivalents.

BRIEF DESCRIPTION OF THE FIGURES

Aspects may be more completely understood in connection with the following drawings, in which.

Figure 1:
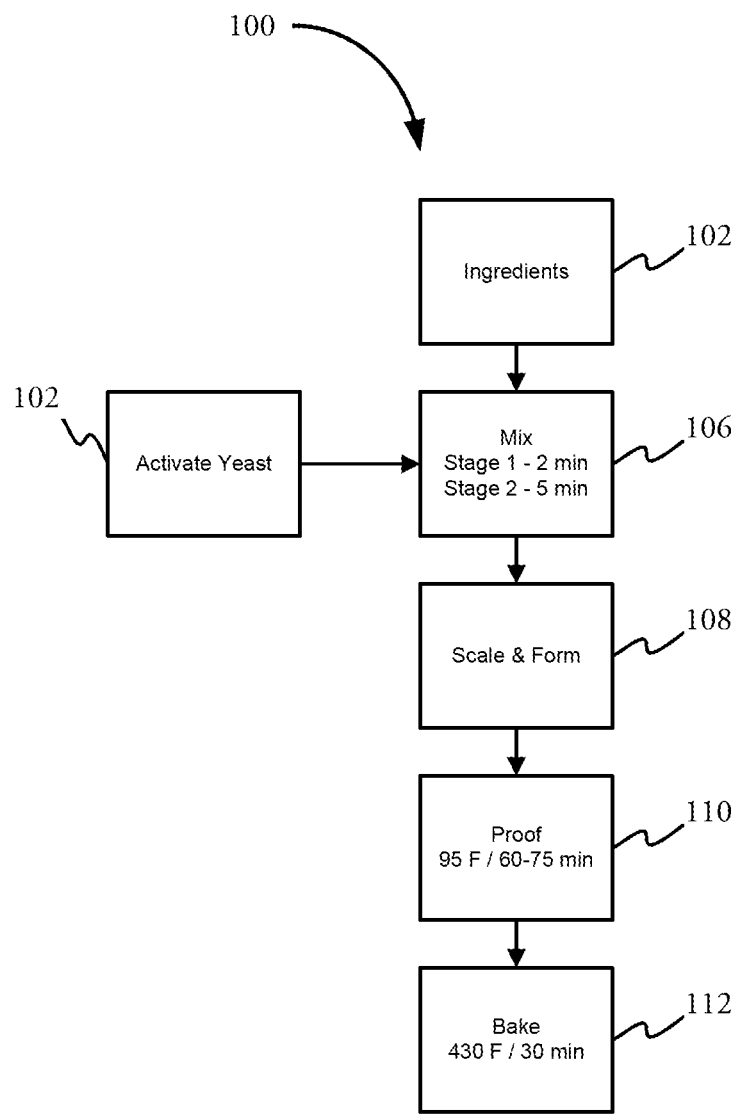
FIG. 1 is a flow chart of a process for making a gluten-free bread in accordance with various embodiments herein.

While embodiments are susceptible to various modifications and alternative forms, specifics thereof have been shown by way of example and drawings, and will be described in detail. It should be understood, however, that the scope herein is not limited to the particular embodiments described. On the contrary, the intention is to cover modifications, equivalents, and alternatives falling within the spirit and scope herein.

DETAILED DESCRIPTION

The embodiments described herein are not intended to be exhaustive or to limit the invention to the precise forms disclosed in the following detailed description. Rather, the embodiments are chosen and described so that others skilled in the art can appreciate and understand the principles and practices.

All publications and patents mentioned herein are hereby incorporated by reference. The publications and patents disclosed herein are provided solely for their disclosure. Nothing herein is to be construed as an admission that the inventors are not entitled to antedate any publication and/or patent, including any publication and/or patent cited herein.

As referenced above, the market for gluten-free foods is quite substantial. However, gluten-free formulations exhibit rapid staling, leading to poor shelf-life in the absence of being stored frozen or the use of modified atmosphere packaging. In addition, to shorter shelf-life, gluten-free baked products typically exhibit poor machinability, dense loaf volume, gritty/brittle texture, and undesirable flavor.

As such, there is a substantial unmet need in the industry for gluten-free bread formulations that process well on traditional lines for producing bread with good loaf volume, great taste, great texture, and increased shelf-stability.

The inventors herein have discovered that by combining a unique set of starches and hydrocolloids with unique physical, chemical, and functional properties it is possible to overcome the above challenges with gluten-free formulations.

As used herein, the term "shelf stable" with reference to a bread product is defined as a bread that is packed under normal packaging conditions (e.g., no modified atmospheric packaging (MAP)) and can be stored at room temperature for at least 14, 21, or 28 days.

Starch

Starch consists of two kinds of glucose polymers (amylose and amylopectin). Depending on the plant, starch generally contains 20-25% amylose and 75-80% amylopectin. In general, grain-derived starches have a higher amylose content than tuber-derived starches.

Amylose is an essentially a linear molecule, consisting of α-(1,4)-linked D-glucopyranosyl units with a degree of polymerization (DP) in the range of 500 to 6,000 glucose residues. Table 1 below shows the amylose content and granule size of various starches.

TABLE 1

Amylose Content and Granule Size of Various Starches

| Starch Source | % Amylose | Granule Size Range (μm) | Average Size (μm) |
|---|---|---|---|
| Waxy Rice | 0 | 2-15 | 6 |
| High Amylose Corn | 70 | 4-20 | 10 |
| Corn | 28 | 5-25 | 14 |
| Cassava | 17 | 3-30 | 14 |
| Waxy Sorghum | 0 | — | — |
| Wheat | 26 | 3-35 | 7 and 20 |
| Sweet Potato | 18 | 4-40 | 19 |
| Arrowroot | 21 | 9-40 | 23 |
| Sago | 26 | 15-50 | 33 |
| Potato | 20 | 10-100 | 36 |

In contrast to amylose, amylopectin is a very large, highly branched chain molecule with a DP ranging from $3\times10^5$ to $3\times10^6$ glucose units and consists of α-(1,6)-linked D-glucopyranosyl units attached to α-(1,4)-bonds. However, starches of some particular genotypes of maize, barley, rice, and wheat etc. contain either an increasing amylose content (i.e. amylostarch up to 70% amylose) or an increasing amylopectin content (i.e. waxy starch with 99-100% amylopectin). Table 2 below shows the ratio of amylose and amylopectin in some starches. Table 3 below shows the characteristics of some starch granules.

TABLE 2

Ratio of amylose and amylopectin in some starches

| Source | Amylose (%) | Amylopectin (%) |
|---|---|---|
| potato | 21 | 79 |
| maize | 28 | 72 |
| wheat | 26 | 74 |
| tapioca | 17 | 83 |
| waxy maize* | — | 100 |

TABLE 3

Characteristics of some starch granules

| Starch | Type | Size of Grain (in μm) Range | Average | Shape |
|---|---|---|---|---|
| potato | tuber | 5-100 | 40 | oval spherical |
| maize | grain | 2-30 | 15 | round polygonal |
| wheat | grain | 1-45 | 25 | round lenticular |
| tapioca | root | 4-35 | 25 | oval truncate |
| waxy maize | grain | 3-26 | 15 | round polygonal |

The role of starch in staling of bread and bakery products has been studied extensively. Staling is usually characterized as toughening of the crust, firming of the crumb, loss of moisture and flavor, and corresponding loss in product freshness. As to the two types of starch components, amylose is considered to be primarily responsible for gel structure and crystallinity, while amylopectin is responsible for long-term rheological and structural changes of gels. Therefore, amylose is considered to be primarily responsible for staling in baked products. The amylose content affects firmness of starch gels. The higher the amylose content the firmer the gel and vice versa. On the other hand, amylopectin contributes to a softer gel by slowing the gel formation.

Cross-linking is a common modification method used to improve the performance of native starches. Cross-linking reinforces the granules of starch to be more resistant to degradation from pH, heat, and shear. Cross-linking tends to help with slowing the retrogradation rate.

Amylose Content and Amylose to Amylopectin Ratios

As applied to either bread flour, the starch blend is selected to have about 10, 11, 12, 13, 14, 15, 16, 17, 18, 19, 20, 21, 22, 23, or 24 percent by weight of amylose. The starch blend can have a range of amylose content wherein any of the foregoing percentages can serve as the upper or lower bound of the range, provided that the upper bound is larger than the lower bound. In some embodiments, the starch blend can have an amount of amylose from about 14 to 20%. In some embodiments, the starch blend can have an amount of amylose from about 16 to 18%.

As applied to bread flour, the components of the starch blend can be selected to have a specific ratio of amylose to amylopectin. In some embodiments, the range can be from 1:2 to 1:5. In some embodiments, the range can be from 1:3 to 1:4. In some embodiments, the ratio of amylose to amylopectin can be about 1:3.5.

Bread Flour

Embodiments of bread flour herein can include a starch component that is a combination of native starch, waxy starch, and modified (cross-linked) starch.

Embodiments of methods of making gluten-free bread flour can include: selecting sources of native starch, waxy starch, and modified (cross-linked) starch and combining them in unique proportions to deliver a targeted amylose content and amylose/amylopectin ratios.

In various embodiments, the waxy starch content can be about 5, 7, 9, 11, 13, 15, 17, or 19% of the total gluten-free bread flour composition. In some embodiments, the waxy starch content, of the total gluten-free bread flour composition, can be in a range wherein any of the foregoing numbers can serve as the upper or lower bound of the range. In some embodiments, the waxy starch content can be up to 5%, 10%, or 15% of the total gluten-free bread flour composition.

In various embodiments, the modified (cross-linked) starch content can be about 20, 25, 30, 35, 40, 45, 50, 55, or 60% of the total gluten-free bread flour composition. In some embodiments, the modified (cross-linked) starch content can be in a range wherein any of the foregoing numbers can serve as the upper or lower bound of the range. In an embodiment, the modified (cross-linked) starch content can be up to 40%, 45%, or 50% of the total gluten-free bread flour composition.

In an embodiment, the native starch content can be about 40%, 45%, 50%, 55%, 60%, 65%, 70%, 75%, or 80% of the gluten-free bread flour composition. In various embodiments, the native starch content can be in a range wherein any of the foregoing percentages can serve as the upper or lower bound of the range, provided that the upper bound is greater than the lower bound.

In some embodiments, the gluten-free bread flour is estimated to contain from about 65 to about 88% starch, or about 72 to about 80% starch. An exemplary gluten-free bread flour formulation is shown below in Table 4.

TABLE 4

Gluten-Free Bread Flour Formulation

| Gluten-Free Bread Flour Composition | % by Weight |
|---|---|
| Native Starch | 25-40 |
| Native Waxy Starch | 0.5-15 |
| Modified (Cross-linked) Starch | 40-50 |
| Dried Egg Whites | 4-6 |
| Non Fat Dry Milk | 3-4 |
| Psyllium Fiber | 4-6 |
| HPMC | 3-4 |
| Total | 100% |

Hydrocolloids

Hydrocolloids such as xanthan gum, guar gum, carrageenan, cellulose and its derivatives, etc. can be used alone or in combination in gluten-free formulations. Hydrocolloids perform several functions such as providing for: viscosity, film forming to retain gas cells and foam stabilization, and imparting structure.

However, it has been discovered that not all hydrocolloids perform well in gluten-free compositions. In particular, gums such as xanthan, guar, carboxymethyl cellulose tend to lose their viscosity with increase in temperature of the dough during baking process, which results in inferior bread.

Of the hydrocolloids, a modified cellulose like hydroxypropylmethyl cellulose (HPMC) has a very unique property in that it forms thermoreversible gels. Thermoreversible gels have a viscosity that tends to increase with increasing temperature and decrease with decreasing temperature. This property of HPMC is very useful during baking of gluten-free formulations.

Psyllium husk fiber is actually the extracted mucilage of *Plantago ovata* and consists of a mixture of gel-forming and non-gel forming fractions. The gel-forming ability of psyllium husk is advantageous as it lends to formation of film during hydration and improved retention of the $CO_2$ during proofing, providing superior baking performance.

Applicants have discovered that by combining psyllium husk fiber and a thermoreversible hydrocolloid, such as hydroxypropylmethyl cellulose (HPMC), in specific proportions can provide critical viscosity and functionality needed for desirable properties of the gluten-free dough.

In an embodiment, the preferred cellulose derivative is a hydroxypropylmethyl cellulose (HPMC) with the following properties: viscosity range of 2700-5000 mPa·s at 2% concentration, methoxyl content of 20-24%, hydroxypropyl content of 7-12%, and gelation temperature of 75-85° C. Other forms of HPMC can be used as well.

In an embodiment, the "gluten-free bread flour" can further include a psyllium husk fiber and a hydroxypropyl methyl cellulose (HPMC) in a ratio of 2:1.

Other Components

Other components of gluten-free bread flour, or other types of flours can include, but are not limited to:

Tapioca flour, rice flour, sorghum flour, waxy sorghum flour, millet flour, potato flour, buckwheat flour, or combination thereof.

Hydrocolloids including, but not limited to, xanthan gum, carrageenan, guar gum, microcrystalline cellulose, or a combination there of.

Insoluble fibers including, but not limited to, sugarcane fiber, wheat bran, oat fiber, etc.

Protein ingredients including, but not limited to, dried egg proteins, whole egg proteins, non-fat dry milk, milk protein concentrate, caseinates, whey protein, soy protein etc.

Sweeteners including, but not limited to, sugar, glucose, fructose, maltose, maltodextrins, high fructose corn syrup, malt syrup, grain syrups such as sorghum syrup etc.

Other optional ingredients such as liquid oils (canola, soy, etc), butter, salt, sugar, yeast (active and dry), mold inhibitors flavors (sorbic acid, calciumpropionate, sodium benzoate etc) nuts, seeds, dried fruits, and inclusions.

Leavening agents including, but not limited to, sodium bicarbonate and ammonium bicarbonate.

Flavor enhancers including, but not limited to, monosodium glutamate, inactive dry yeast.

Food coloring agents including both natural and artificial colors.

Methods of Producing Gluten-Free Bakery Products

Included herein are the methods of making gluten-free products, including but not limited to gluten-free bread and other gluten-free baked products.

In some embodiments of making a gluten-free bread, a step of selecting specific starch ingredients and combining them in desired proportion to a target amylose content of 16-18% and amylose:amylopectin ratios of between about 1:3 and 1:4 can be included The method can include further combining a starch blend with other ingredients and mixing them into a dough of desired consistency. The dough consistency can be measured using a texture analyzer such as a Kieffer Dough Extensibility Rig as described herein.

Gluten-free bread doughs herein can have a relatively soft consistency (Rmax, E and Rmax/E values of 17 g, 8.5 mm, and 2 respectively). One advantage of this gluten-free bread dough is its consistency, which allows it be formed and processed on traditional bread manufacturing line. The dough can be further scaled, formed, proofed and baked.

Aspects of a method 100 for making a gluten-free bread in accordance with various embodiments herein are shown in the flow chart of FIG. 1. The method of making a gluten-free bread can include an operation of obtaining ingredients 102 (as described herein). The method can also include an operation of activating yeast 104. Activating yeast can include mixing dry yeast with portion of water (90° F.), sugar, and stirring for 5-10 minutes at until the yeast starts foaming. The ingredients and the activated yeast can then be mixed 106 in another operation. In various embodiments, the mixing can occur in stages. By way of example, in some embodiments, there can be a first stage of mixing and a second stage of mixing. The first stage of mixing can include the premixing of dry ingredients and butter/shortening at a slower speed. The first stage of mixing further include addition of yeast solution and mixing at a slower speed until dough starts to form into a cohesive mass. In some embodiments, the first stage of mixing can last from about 10 seconds to about 5 minutes. In some embodiments, the first stage of mixing can last about 2 minutes. In a second stage of mixing, the mixing is done at relatively high speed allowing full hydration of dry ingredients and completely developing dough cohesive network. In some embodiments, the second stage of mixing can last from about 2 minutes to about 10 minutes. In some embodiments, the second stage of mixing can last about 5 minutes.

In some embodiments, the method of making a gluten-free bread can also include an operation of scaling and forming 108. During the process of scaling and forming, the bulk dough is first weighed and divided into individual pieces of predetermined weight, as per the desired finished loaf size. Then, the individual dough pieces are folded and formed into a cylindrical loaf and placed into the pan.

The method of making a gluten-free bread can also include an operation of proofing 110. Proofing 110 can include keeping the shaped dough in controlled temperature and relative humidity chamber (such as 90-100° F., 85-100% RH) for a final rise. By way of example, in some embodiments proofing can be done at 80, 85, 90, 95, 100, 105, or 110 degrees Fahrenheit (or in a range between any of the foregoing temperatures) for about 30, 35, 40, 45, 50, 55, 60, 65, 75, 80, 85, 90, or 95 minutes (or in a range between any of the foregoing times). Proofing is complete when the dough reaches a standard height (volume).

The method of making a gluten-free bread can also include an operation of baking 112. Baking 112 can include baking the dough at a temperature of about 390, 400, 410, 420, 430, or 450 (or in a range between any of the foregoing temperatures) for about 15, 20, 25, 30, 35, 40, or 45 minutes (or in a range between any of the foregoing times).

Figure 5:
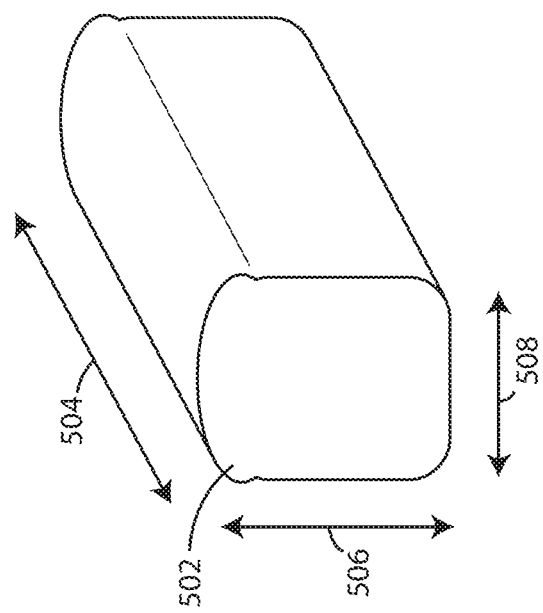
FIG. 5 is a schematic view of a baked product in accordance with various embodiments herein.

Baked products herein can include breads of various types as well as other type of baked products. Referring now to FIG. 5, a schematic view is shown of a baked product 502 in accordance with various embodiments herein. The baked product 502 has a length 504, a height 506, and a width 508. The length 504 can vary but in some embodiments can be about 2, 4, 6, 8, 10, 12, 14, 16, 18 or 20 inches, or in a range wherein any of the foregoing lengths can serve as the upper or lower bound of the range provided that the upper bound is greater than the lower bound. The height can also vary depending on the baked product type such as a flatbread versus a traditional loaf. In some embodiments, the height can be about 0.25, 0.5, 1, 2, 3, 4, 5, 6, 7 or 8 inches, of in a range wherein any of the foregoing heights can serve as the upper or lower bound of the range provided that the upper bound is greater than the lower bound. The width 508 can also vary but in some embodiments can be about 2, 4, 6, 8, 10, 12, 14, 16, 18 or 20 inches, or in a range wherein any of the foregoing widths can serve as the upper or lower bound of the range provided that the upper bound is greater than the lower bound. The overall profile of the baked product 502 can take various forms including a substantially box-like form or traditional loaf shape, a sheet-like form, a large circular or ovoid shape, or the like.

Figure 6:
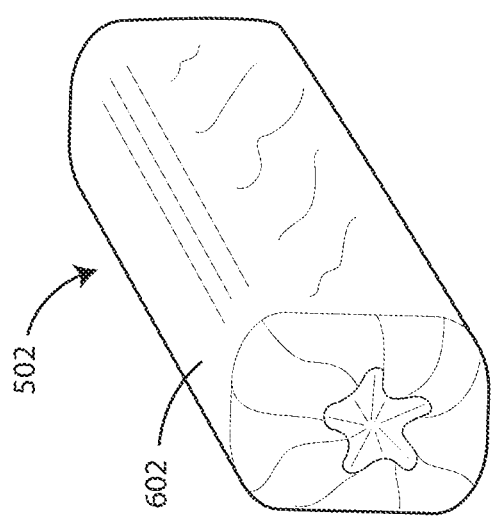
FIG. 6 is a schematic view of a baked product in accordance with various embodiments herein.

The baked product can also include one or more layers of an overwrap or packaging, such as one or more polymeric layers. However, in various embodiments herein, the packaging is not modified-atmosphere packaging (MAP). Referring now to FIG. 6, a schematic view is shown of the baked product 502 including a polymeric overwrap 602.

The shelf-stable baked product can include a substantial amount of air entrained within the body of the baked product. In various embodiments, the baked product can have a specific volume of at least about 0.5, 1.0, 1.5, 2.0, 2.5, 3.0, 3.5, 4.0 or 4.5 cc/g, or can be in a range wherein any of the foregoing numbers can serve as the upper or lower bound of the range, provided that the upper bound in greater than the lower bound.

Dough Rheology

Dough rheology can be measured by several instruments. For example, the gluten-free dough rheological properties are measured using the Kieffer Dough and Gluten Extensibility Rig on the Texture Analyzer according to the method of Kieffer et al., *Correlations of the breadmaking performance of wheat flour with rheological measurements on a microscale*, Journal of Cereal Science, 27: 53-60 (1998).

The measurements of dough rheology can include: $R_{max}$ (resistance to extension, g), E—extensibility until dough rupture (mm), and ratio of Rmax/E (measure of dough relative firmness). Aspects of dough rheological measurement curves are show in FIGS. 2A-2B.

In embodiments here in, the optimized gluten-free bread doughs have resistance to extension Rmax values of about 14 to 20 g, or about 17 g, extensibility (E) values of about 6 to 11 mm, or about 8.5 mm, Rmax/E values of about 1 to 3, or about 2, respectively.

Bread Texture

The freshness (staling) of bread is generally monitored by measuring the changes in firmness of loaf over its shelf life. One such technique is to measure the firmness of bread with a texture analyzer (TA. XT2 Plus Stable Micro Systems Ltd) according to the AACC Approved Method 74-09 (AACC 2000). Firmness (g-force) values are reported over the storage period. The lower the firmness values, the softer the bread.

In embodiments herein, the optimized gluten-free bread has lower firmness values (<1000 g) during a 14 day, 21 day or 28 day shelf life.

Further Embodiments

In an embodiment, the "gluten free bread flour" composition consists of a selective starch blend comprising of starches from the following: (a) a native starch with 20-30% amylose content (b) a native waxy starch with 0-1% amylose content, and (c) a modified (cross-linked) starch.

In an embodiment, the 3 starch components are blended in desired proportions to a target amylose content of 16-18% and an amylose:amylopectin ratio of 1:3.5. In an embodiment of the 'gluten-free bread flour', the native starch content varied from 25-40%, waxy starch content from 0.5-15%, and modified (cross-linked) starch from 40-50%.

In an embodiment, the native starch used in the "gluten-free bread flour" can be from a selective group: wheat starch (gluten free), corn, potato, rice, tapioca and combination thereof.

In an embodiment, the preferred native starch is the wheat starch (gluten free).

In an embodiment, the waxy starch in the "gluten-free bread flour" can be from a selective group: corn, rice, potato or combination thereof.

In an embodiment, the modified (cross-linked) starch can be from a selective group of corn, potato and combination thereof.

In an embodiment, the "gluten-free bread flour" can further include a psyllium fiber and a hydroxypropyl methyl cellulose (HPMC) in a ratio of 2:1.

In an embodiment, the "gluten-free bread flour" can further include a protein blend consisting of dried egg whites and NFDM.

In an embodiment, the optional ingredients such as oil, salt, sugar, yeast, mold inhibitors, flavors, colors, nuts, seeds, fruits, fibers, and inclusions can be added to create multiple recipes and delicious products.

In an embodiment, the method involves mixing "gluten-free bread flour" and optional ingredients with water to a desired consistency to a formable dough. The method includes further steps of scaling the dough, forming/shaping to desired shape, proofing, and baking to a finished product.

In an embodiment, gluten-free bread has a good loaf volume, crumb structure, and maintains soft/moist texture over 14-28 days at ambient temperature.

In an embodiment, gluten-free bakery products can include buns, rolls, bagels etc.

Aspects may be better understood with reference to the following examples. These examples are intended to be representative of specific embodiments, but are not intended as limiting the overall scope of embodiments herein.

EXAMPLES

Example 1—Gluten-Free Bread Formulation

In this example, an exemplary "gluten-free bread flour" composition is provided. The variations of the composition can be adopted for further product application.

| Gluten-Free Bread Flour Composition | % by Weight |
| --- | --- |
| Native Starch | 40.0 |
| Native Waxy Starch | 0.5 |
| Modified (cross-linked) Starch | 42.5 |
| Dried Egg Whites | 5.0 |
| Non Fat Dry Milk | 4.0 |
| Psyllium Husk Fiber | 5.0 |
| HPMC | 3.0 |
| Total | 100% |
| Amylose Content | 20.0 |
| Amylopectin Content | 58.0 |

Example 2—Effect of Varying Amylose Content on Loaf Volume and Texture

In this experiment, the amylose content of the "Gluten-Free Flour" formulation of Example 1 was adjusted by substitution (12.5%, 25% and 50%) of a native wheat starch with a waxy corn starch (WCS). As such, the "control" formulation for this example is the formulation of Example 1. The other components in the gluten-free flour were kept constant.

The formulations were baked according to the procedure described in FIG. 1. The baking performance of these formulations were noted. The control and test formulation with 12.5% WCS substitution produced breads with good loaf volume and texture. However, at 25% and 50% substitution levels, the breads have lower loaf volumes, have collapsed concave structure, and gummy texture.

| Property | Control | Test 1- 12.5% WCS | Test 2 - 25% WCS | Test 3 - 50% WCS |
| --- | --- | --- | --- | --- |
| Amylose (AM) | 20 | 17 | 14 | 10 |
| Amylopectin (AP) | 57.5 | 60 | 62.5 | 65 |
| AM:AP | 1:2.9 | 1:3.5 | 1:4.5 | 1:6.5 |
| % Amylose Reduced | — | 15% | 30% | 50% |
| Baking Performance | Good | Good | Poor | Very Poor |

WCS = Waxy Corn Starch

Example 3—Rheological Properties of Gluten-Free Bread Dough

Figures 2A, 2B:
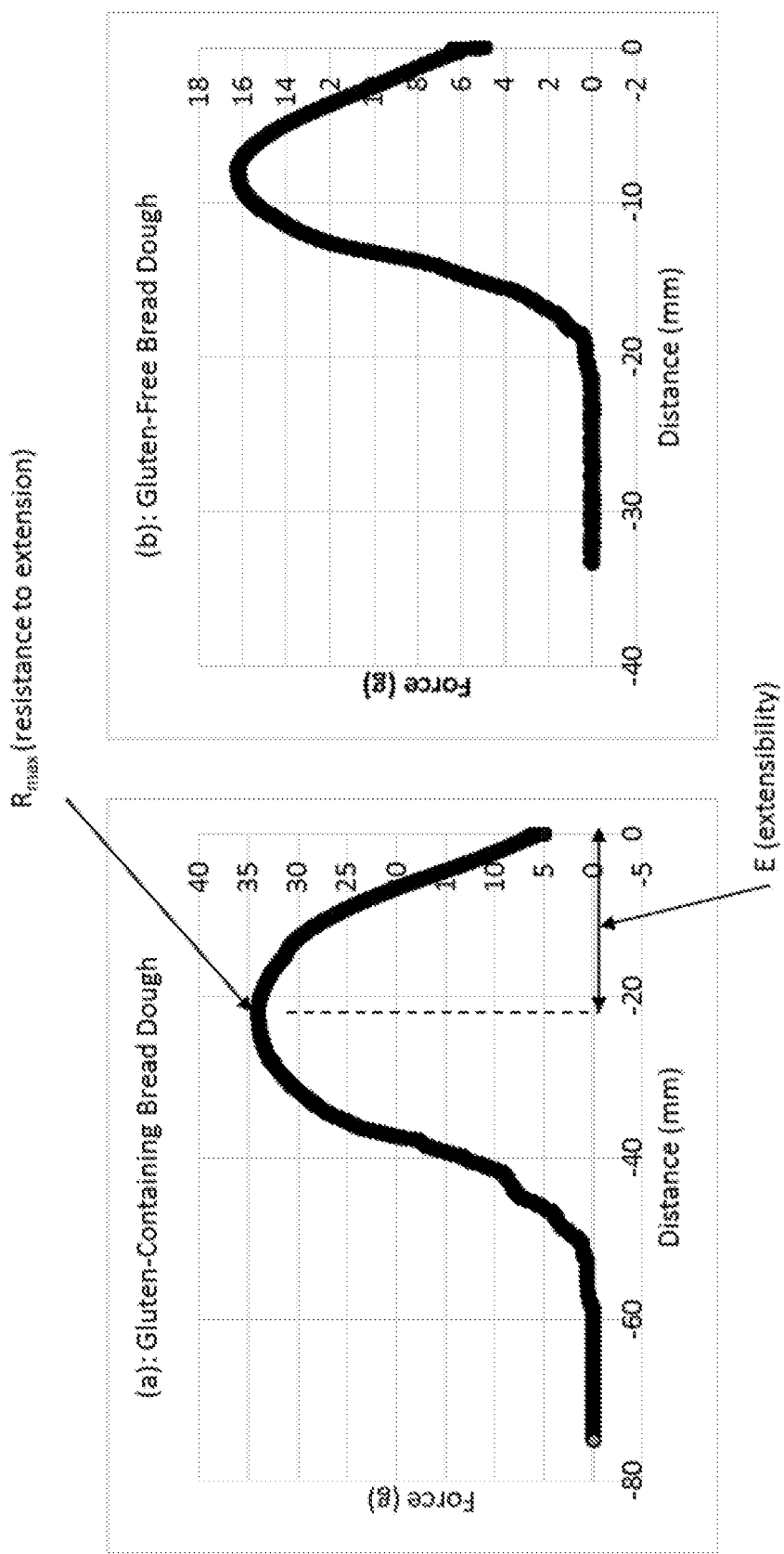
FIGS. 2A-2B are graphs of typical Keiffer extensigraph curves for gluten-containing bread dough (2A) and gluten-free bread dough (2B).

In this example, the rheological properties of gluten-free bread dough were measured using the Kieffer Dough and Gluten Extensibility Rig on the Texture Analyzer according to the method of Keiffer et al. (Correlations of the bread-making performance of wheat flour with rheological measurements on a microscale, Journal of Cereal Science, 1998 27: 53-60). Control doughs (gluten-containing) were also prepared for rheological measurements. The dough strips were prepared by placing the dough in Teflon block and rested for 15-20 minutes. The measurements were made with hook probe at a speed of 3.3 mm/sec. The measurements recorded include: $R_{max}$ (resistance to extension, maximum force g) and extensibility until dough rupture to (extensibility—E, mm). A typical extensibility curve for gluten-free bread dough and a control bread dough are shown in FIGS. 2A and 2B.

The typical gluten-free bread dough has relatively lower resistance to extension (17 g vs 37 g) and lower extensibility (8.5 mm vs 22.5 mm).

| Product Bread Dough | Resistance to Extension $R_{max}$ (g) | Extensibility- E(mm) | $R_{max}/E$ |
| --- | --- | --- | --- |
| Control | 37 | 22.5 | 1.6 |
| Gluten-Free | 17 | 8.5 | 2.0 |

Example 4—Effect of Alpha-Amylase Enzyme Addition on Loaf Volume, Structure and Texture In this example, the alpha-amylase enzyme (Powerfresh 8013) was added at varying levels (0.025-0.2%) to the "gluten-free flour" formula of Example 1 and was tested for its baking performance. The breads were baked as per the standard process described in FIG. 1. The enzyme addition to the formulation has resulted in poor loaf volume, collapsed structure, and undesirable gummy texture.

Example 5—Effect of Amylose Content on Firmness of Bread During Storage

Figure 3:
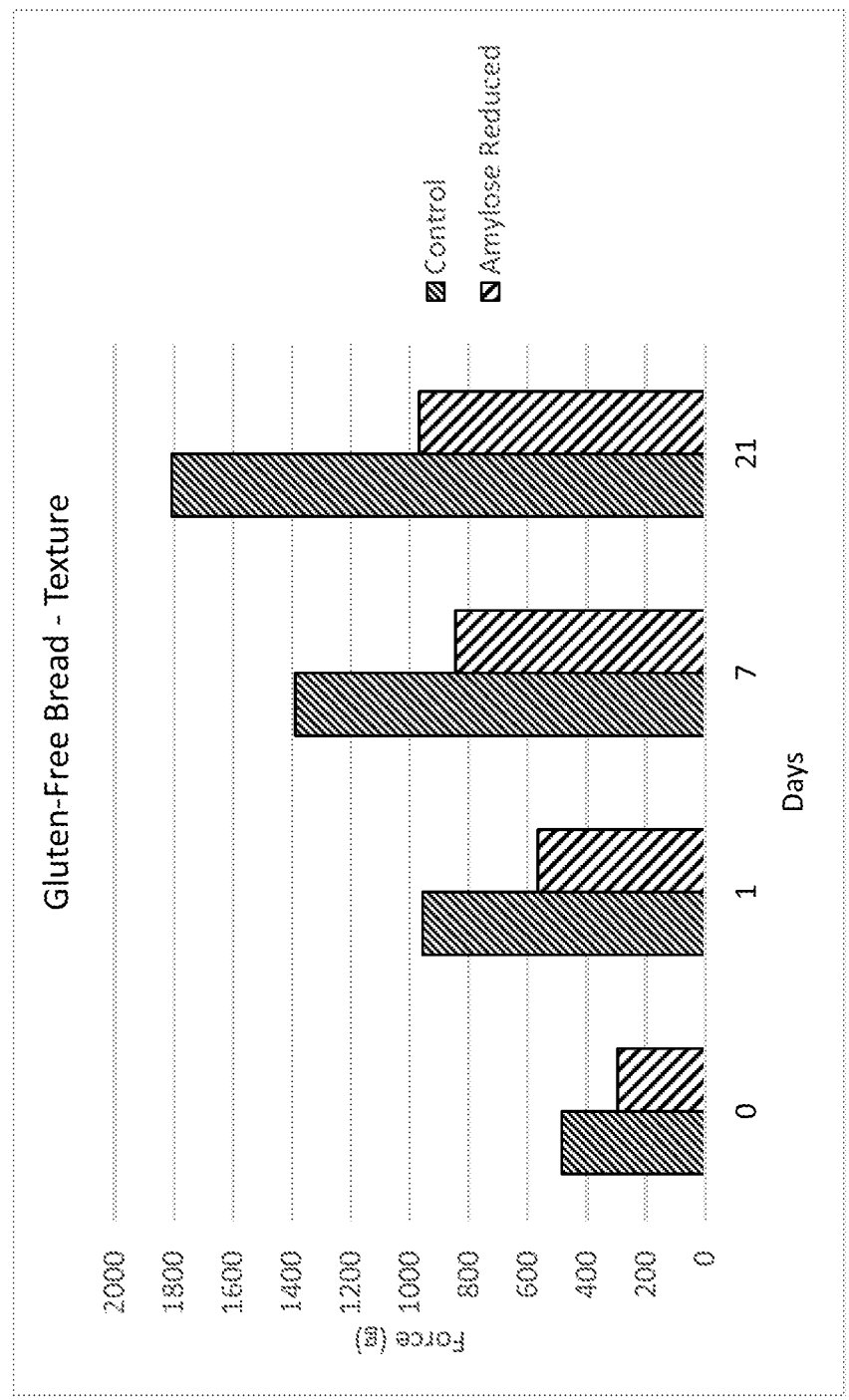
FIG. 3 is a graph showing changes in texture of gluten-free breads over 21 days.

For shelf life study, two sets of gluten-free breads were produced from: (1) Control Gluten-free Bread Formulation (20% amylose) (formulation of Example 1), and (2) Amylose Reduced (AMR) Gluten-free Formulation (17% amylose). The loaves were baked on the same day according to the baking process described in FIG. 1, sliced, placed in plastic bags, sealed, and stored at room temperature (20-22° C.). The loaves were evaluated for firmness after 0, 1, 3, 7, 14, 21 days. The central slices from each loaf were used to determine firmness, with a texture analyzer (TA. XT2 Plus Stable Micro Systems Ltd) according to the Approved Method 74-09 (AACC 2000). Firmness (g-force) values were reported over the storage period. The lower the firmness values the softer the bread. Amylose reduced (AMR) gluten-free breads were found to have consistently lower firmness values when compared to the control gluten-free bread. The results are shown in FIG. 3.

Figure 4:
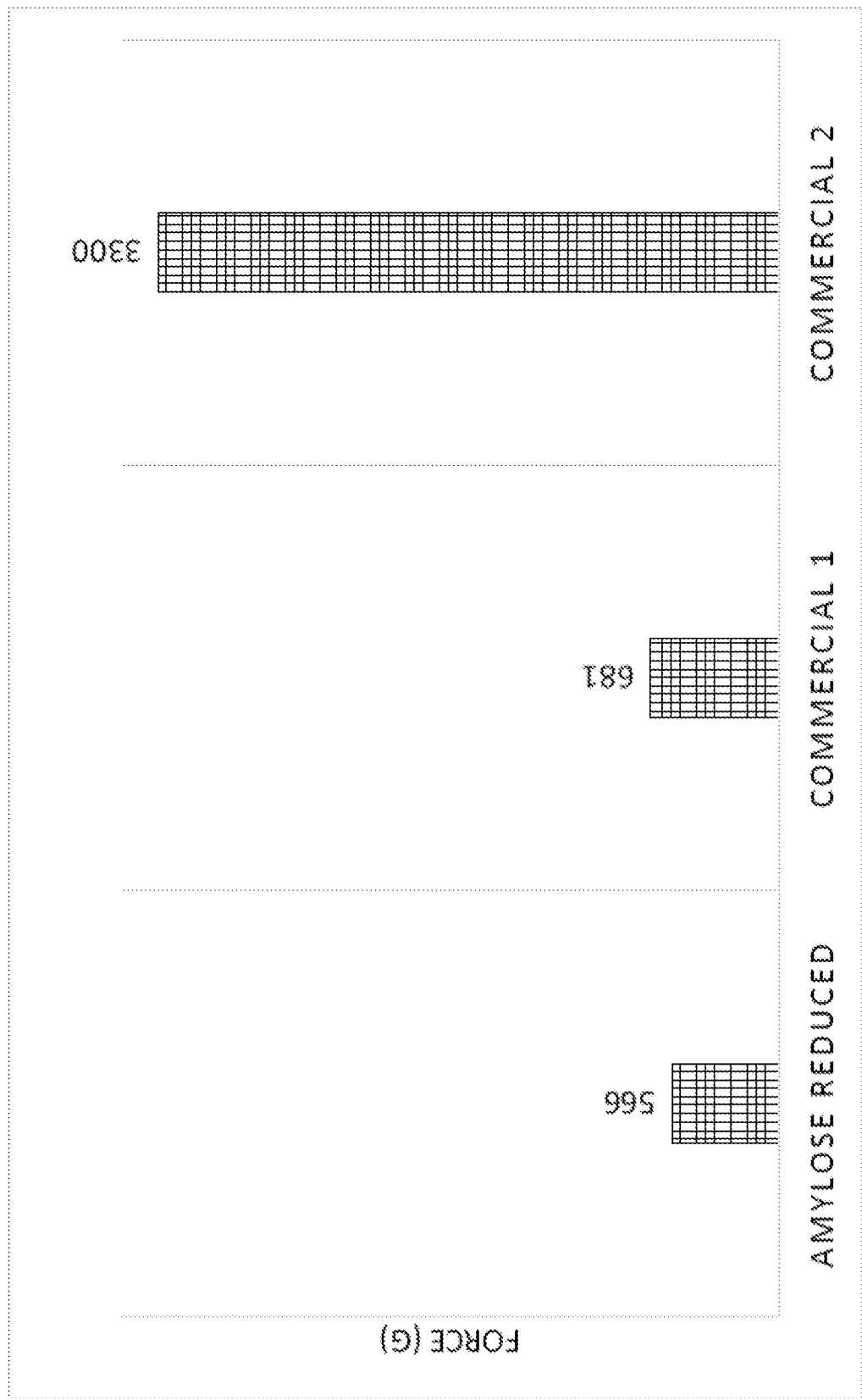
FIG. 4 is a graph showing texture force comparison for amylose reduced gluten-free bread and commercial gluten-free breads.

Example 6—Comparison of Amylose Reduced Gluten-Free Bread Formulations Versus Commercially Available Frozen Gluten-Free Breads In this example, the texture (firmness) of amylose reduced gluten-free bread and two commercial gluten-free frozen bread samples were measured at day 1, using the texture analyzer and compared. The commercial frozen bread samples were thawed at room temperature and equilibrated for a day, prior to taking the measurements. The lower the firmness values the softer the bread. Amylose reduced (AMR) gluten-free bread were found to have lower firmness values when compared to the two commercial samples as shown in FIG. 4

It should be noted that, as used in this specification and the appended claims, the singular forms "a," "an," and "the" include plural referents unless the content clearly dictates otherwise. Thus, for example, reference to a composition containing "a compound" includes a mixture of two or more compounds. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration to. The phrase "configured" can be used interchangeably with other similar phrases such as arranged and configured, constructed and arranged, constructed, manufactured and arranged, and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

Aspects have been described with reference to various specific and preferred embodiments and techniques. However, it should be understood that many variations and modifications may be made while remaining within the spirit and scope herein.

The invention claimed is:

1. A bread flour substitute composition comprising:
a starch blend consisting of
   a native starch with 20-30 wt. % amylose content, wherein the native starch comprises from 40-80 wt. % of the flour substitute composition;
   a native waxy starch with 0-1 wt. % amylose content, wherein the native waxy starch comprises from 5-19 wt. % of the flour substitute composition; and
   a cross-linked starch comprising a corn starch, a potato starch, or a combination thereof, wherein the cross-linked starch comprises from 20-60 wt. % of the flour substitute composition;
a hydrocolloid blend comprising
   hydroxypropyl methylcellulose (HPMC) comprising from 3-4 wt % of the flour substitute composition; and
   *psyllium* fiber comprising from 4-6 wt % of the flour substitute composition; and
the composition including between 0 and 20 ppm gluten.

2. The bread flour substitute composition of claim 1, further comprising dried egg whites.

3. The bread flour substitute composition of claim 2, comprising between 4 to 6 wt. % dried egg whites.

4. The bread flour substitute composition of claim 1, further comprising non-fat dry milk.

5. The bread flour substitute composition of claim 4, comprising between 3 to 4 wt. % non-fat dry milk.

6. The bread flour substitute composition of claim 1, including 25 to 40 wt. % of the native starch with 20-30 wt. % amylose content.

7. The bread flour substitute composition of claim 1, including 0 to 15 wt. % of the native waxy starch with 0-1 wt. % amylose content.

8. The bread flour substitute composition of claim 1, including 40 to 50 wt. % of the cross-linked starch.

9. The bread flour substitute composition of claim 1, the overall composition having an amylose content of 14 to 20 wt. %.

10. The bread flour substitute composition of claim 1, the overall composition having an amylose content of 16 to 18 wt. %.

11. The bread flour substitute composition of claim 1, the overall composition having an amylose:amylopectin ratio of about 1:3 to 1:4.

12. The bread flour substitute composition of claim 1, the overall composition having an amylose:amylopectin ratio of about 1:3.5.

13. The bread flour substitute composition of claim 1, the overall composition having a *psyllium* fiber: hydroxypropylmethyl cellulose ratio of about 2:1.

14. The bread flour substitute composition of claim 1, the native starch with 20-30 wt. % amylose content comprising one or more of wheat, corn, potato, rice and tapioca.

15. The bread flour substitute composition of claim 1, the native waxy starch with 0-1% amylose content comprising one or more of corn, rice, and potato.

16. The bread flour substitute composition of claim 1, the native waxy starch comprising a waxy maize starch.

* * * * *